(12) United States Patent
Browne et al.

(10) Patent No.: US 7,220,927 B2
(45) Date of Patent: May 22, 2007

(54) TURN SIGNAL ASSEMBLIES AND METHODS FOR OPERATING THE SAME

(75) Inventors: Alan L. Browne, Grosse Pointe, MI (US); Nancy L. Johnson, Northville, MI (US); Gary L. Jones, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/229,337

(22) Filed: Sep. 16, 2005

(65) Prior Publication Data

US 2006/0054478 A1    Mar. 16, 2006

Related U.S. Application Data

(60) Provisional application No. 60/610,418, filed on Sep. 16, 2004.

(51) Int. Cl.
*H01H 3/16* (2006.01)

(52) U.S. Cl. .................................................. 200/61.27
(58) Field of Classification Search ... 200/61.27–61.39
See application file for complete search history.

(56) References Cited

U.S. PATENT DOCUMENTS

| 5,021,617 | A | * | 6/1991 | DeShong | 200/61.27 |
| 5,957,442 | A | * | 9/1999 | Hensley | 267/180 |
| 6,732,516 | B2 | * | 5/2004 | Butera et al. | 60/527 |
| 2003/0177974 | A1 | * | 9/2003 | Dominique | 116/200 |
| 2004/0035687 | A1 | * | 2/2004 | von Behrens et al. | 200/6 C |
| 2004/0261688 | A1 | * | 12/2004 | MacGregor et al. | 116/284 |

* cited by examiner

*Primary Examiner*—Richard K. Lee
(74) *Attorney, Agent, or Firm*—Kathryn A. Marra

(57) ABSTRACT

Turn signal assemblies for motor vehicles that employ shape memory alloy actuators to provide automatic cancellation of turn signals. A controller is in operative communication with the shape memory alloy actuator and is programmed to provide an activation signal to the shape memory alloy.

18 Claims, 7 Drawing Sheets

TURN SIGNAL ASSEMBLIES AND METHODS FOR OPERATING THE SAME

CROSS REFERENCE TO RELATED APPLICATIONS

This application relates to and claims priority to U.S. Provisional Patent Application No. 60/610,418 filed on Sep. 16, 2004, incorporated herein by reference in its entirety.

BACKGROUND

The present disclosure generally relates to turn signal assemblies for use in an automotive vehicle, and more particularly, to turn signal assemblies employing shape memory alloy actuated automatic cancellation mechanisms.

Most motor vehicles utilize a turn signal to provide a visible indicator to the driver and others external to the vehicle as to the intended direction of the vehicle. Initial activation of the turn signal is generally by hand movement of a turn signal assembly such as a turn signal stalk, button, switch, or the like. For example, on automotive vehicles the turn signal actuator is typically a turn signal stalk that is located on the left side of a steering column, movement of which generally corresponds to the intended direction of vehicle. Once the turn signal is activated by movement of the turn signal stalk, automatic cancellation is generally achieved via a ratchet or latch type mechanism that is initiated with a physical turning of the steering wheel. The implementation of ratchet and latch type mechanisms within the stalk is relatively complex, requires a relatively large amount of space within the stalk and/or steering column, and is not very robust for the various scenarios in which the turn signal is operated and cancelled.

Generally, the turn signals remain active until manually disabled by the occupant by physical movement of the stalk to the off position or when the steering wheel is turned a predetermined amount and returned. For example, when the steering wheel is turned past a designed-in arc angle in the direction of the intended turn, and subsequently returned, a mechanism is tripped to reset the turn signal to the off position. These pre-determined arc angles are designed by the motor vehicle manufacturer and are fixed angle points within the steering column. As such, multiple fixed angle points are generally utilized to provide a robust automatic cancellation mechanism.

Manually turning off the turn signal can generally be achieved in one of two ways. The first involves the operator physically moving the turn signal stalk back to its original off position. Secondly, the vehicle operator can manipulate the turn signal stalk to an intermediate position between the on and off positions so as to enable the turn signal. As long as the stalk is held in this position, the turn signal remains on. Removing the hand allows the turn signal stalk to return to its original off position. This mode is independent of the steering wheel position or movement and is generally implemented during a lane change, where the turning radius is minimal.

The problem with this art is that the automatic cancel feature generally responds to steering wheel rotation only, and/or employs a complex mechanism that is relatively bulky and expensive to produce. The fact that the current automatic cancel feature is not robust for all driving scenarios has been comprehended in some vehicles by the addition of a chime reminder, which is generally activated automatically based variously on miles or time driven. Accordingly, there remains a need in the art for less complex turn signal actuators that can be readily and easily programmed to account for the variety of scenarios for which automatic turn signal cancellation may be desired.

BRIEF SUMMARY

Disclosed herein are turn signal assemblies and methods for use. In one embodiment, the turn signal assembly comprises a turnstile portion rotatably disposed within a housing and an arm lever extending from the turnstile portion; a first stationary member disposed at an end of the arm lever, wherein the first stationary member is stationary relative to the arm lever; a second stationary member disposed within and stationary relative to the turnstile portion; at least two counter opposing wires formed of a shape memory alloy attached to the first stationary member and at a pivot point of the second stationary member, wherein the at least two counter opposing wires are spaced apart at the first stationary member and define the pivot point at the second stationary member; and a controller in operative communication with the shape memory alloy.

In another embodiment, a turn signal assembly comprises a turnstile portion rotatably disposed within a housing, wherein the housing further comprises a wall having a first detent position, a second detent position, and a third detent position; an arm lever fixedly attached to the turnstile portion and extending from an opening in the housing; a finger portion fixedly attached to the turnstile portion, wherein the finger portion houses a piston head assembly in operative communication with a selected one of the first detent, the second detent and the third detent, wherein the piston head assembly comprises an open ended housing, a slidable piston head disposed at the open end, a bias spring intermediate the slidable piston head and a back wall within the open ended housing, and a shape memory alloy in operative communication with the piston head and adapted to slide the piston head within the open ended housing; and a controller in operative communication with the shape memory alloy.

In yet another embodiment, the turn signal assembly comprises a rotatable member engaged with a turnstile portion rotatably disposed within a housing, wherein the housing further comprises a wall having a first detent position, a second detent position, and a third detent position; an arm lever fixedly attached to the turnstile portion and extending from an opening in the housing; a first wire formed of a shape memory alloy wrapped about the rotatable member in a first direction and having one end fixedly attached to the rotatable member and an other end fixedly attached to a stationary member external to the rotatable member; a second wire formed of the shape memory alloy wrapped about the rotatable member in a direction opposite to the first direction and having one end fixedly attached to the rotatable member and an other end fixedly attached to a stationary member external to the rotatable member; and a controller in operative communication with the shape memory alloy.

In still another embodiment, a turn signal assembly comprises an arm lever fixedly attached to a turnstile portion, the turnstile portion rotatably disposed within a housing, wherein the housing further comprises opposing sidewalls; a detent member comprising a first element having one end pivotably attached to one end of a second element and a third element pivotably attached to an other end of the second element, each one of the first and third elements having a free end spring biased against a selected one of the opposing sidewalls, wherein the first and third elements define temporary detent positions and the second element defines a permanent detent position; a first shape memory alloy wire connected to the free end of the first element and one of the opposing sidewalls, and a second shape memory alloy wire connected to the free end of the third element and the other one of the opposing sidewalls; a finger portion projecting from the turnstile portion and engageable with a selected one of the first, second, and third detent positions; wherein the finger portion houses a piston head assembly in operative communication with a selected one of the first detent position, the second detent position and the third detent position; and a controller in operative communication with the first and second shape memory alloy wires.

A method of operating a turn signal assembly comprises moving a turn signal stalk to an active detent position; and activating a shape memory alloy to effect movement of the turn signal stalk from the active detent position to a neutral detent position The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Figure 1:
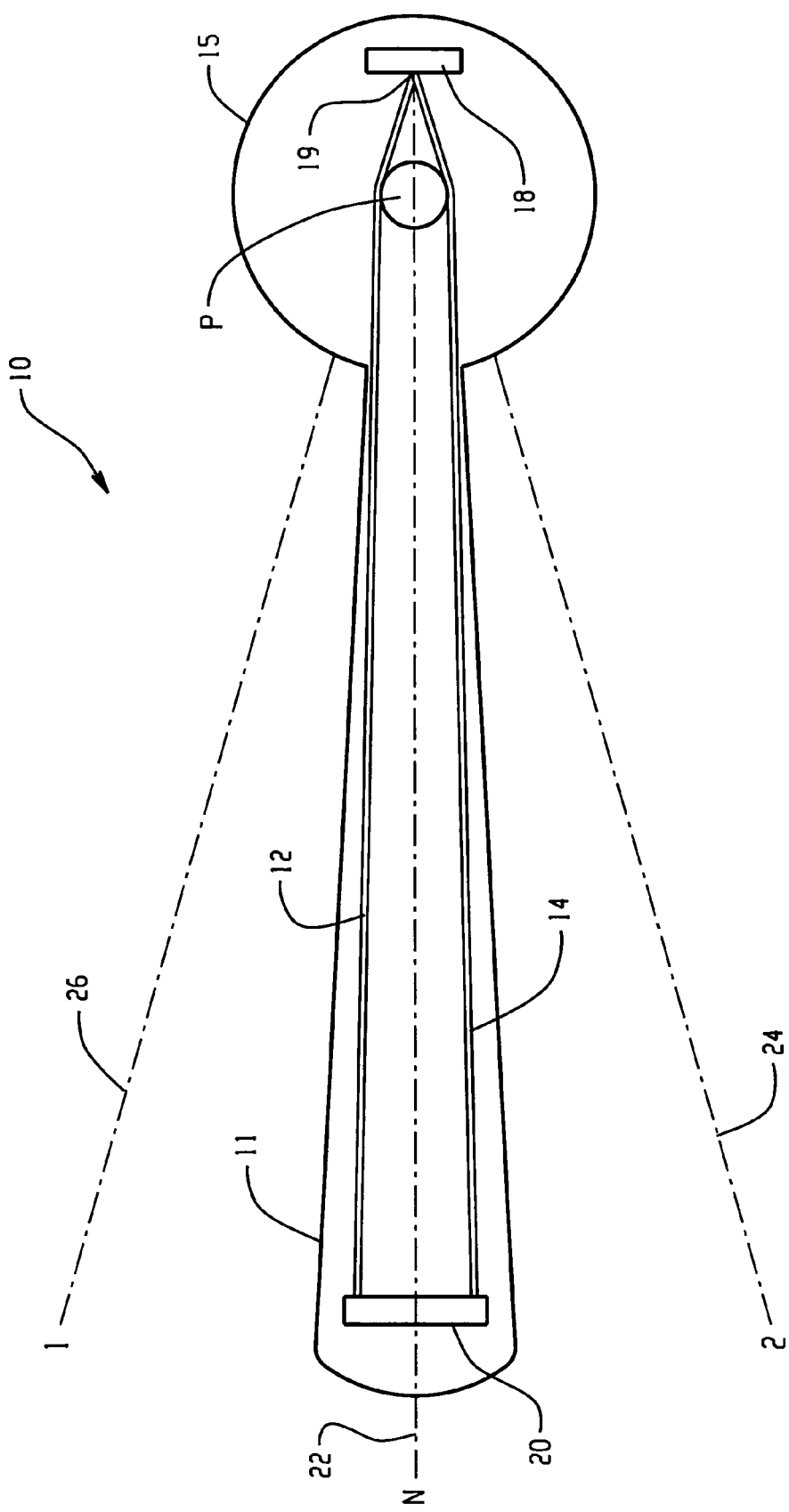
FIG. 1 illustrates a front plan view of a turn signal assembly for a motor vehicle in accordance with one embodiment.

Disclosed herein are turn signal assemblies for motor vehicles that employ actuators based on shape memory alloys (SMAs). SMAs typically exist in several different temperature-dependent phases. The most commonly utilized of these phases are the so-called martensite and austenite phases. In the following discussion, the martensite phase generally refers to the more deformable (lower modulus), lower temperature phase whereas the austenite phase generally refers to the more rigid, higher temperature phase.

When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$). When the shape memory alloy is in the austenite phase and is cooled, it begins to change into the martensite phase, and the temperature at which this phenomenon starts is referred to as the martensite start temperature ($M_s$). The temperature at which austenite phase finishes transforming to martensite is called the martensite finish temperature ($M_f$). Generally, the stiffness (elastic modulus) of shape memory alloys is significantly greater (2.5 to 3 times for common SMAs) in their austenitic phase as compared to that in their martensitic phase.

SMAs can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Note that a special class of shape memory alloys, magnetic shape memory alloys, exhibits a one-way shape memory effect when subjected to a magnetic field.

Intrinsic and extrinsic two-way shape memory materials are characterized by a shape transition both upon heating from the martensite phase to the austenite phase, as well as an additional shape transition upon cooling from the austenite phase back to the martensite phase. SMAs that exhibit an intrinsic shape memory effect are fabricated from compositions that will automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, SMAs that exhibit the extrinsic two-way shape memory effects are composite or multi-component materials that combine a shape memory alloy composition that exhibits a one-way effect with another element that provides a restoring force to reform the original shape.

The temperature at which a shape memory alloy remembers its high temperature form when heated can be adjusted by slight changes in the composition of the alloy and through heat treatment. In nickel-titanium shape memory alloys, for example, it can be changed from above about 130° C. to below about −100° C. The shape recovery process for some shape memory alloys occurs over a range of just a few degrees and the start or finish of the transformation can be controlled to within a degree or two depending on the desired application and alloy composition. Other shape memory alloys recover over a range of 10 to 20 degrees. The mechanical properties of the shape memory alloy vary greatly over the temperature range spanning their transformation, typically providing the shape memory material with shape memory effects as well as high damping capacity.

Suitable shape memory alloy materials include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

For example, a nickel-titanium based alloy is commercially available under the trademark Flexinol from Dynalloy, Inc.

Turning now to FIG. 1, there is shown a turn signal assembly in accordance with one embodiment of the present disclosure. In general, the turn signal assemblies described herein can be adapted to be passively operated where no external control other than operator manipulation is utilized and/or alternatively, be logically controlled based on sensor input to effect automatic cancellation. As shown in FIG. 1, the turn signal assembly 10 employs an actuation mechanism that includes counter-opposing wires 12, 14 about a fixed pivot point P, wherein the wires are formed of a shape memory alloy (SMA). The wires may be formed from SMAs exhibiting similar or different phase transformation temperatures as may be desired for various applications.

The wires 12, 14 are fixedly attached to rigid and stationary structures 18, 20 at each end of a stalk 11. At stationary structure 20, the wires 12, 14 are space apart whereas at stationary structure 18 the wires converge at or about a common attachment point 19. One end of the stalk is rotatably attached at turnstile portion 15 to the steering column. As will be described in greater detail below with respect to the other embodiments, the turnstile portion 15 further includes a mechanism (not shown) for temporarily maintaining the selected turn signal at positions 22, 24, or 26, e.g., a detent mechanism. The shape memory alloy wires 12, 14 (as well as the shape memory alloy compositions employed in the various other embodiments disclosed herein) are selected to have relatively high phase transition temperatures such that during so called normal operating conditions the shape memory alloy wires would be in the lower modulus martensite phase. As used herein, the term "normal operating conditions" refers to the ambient temperatures that the wires are exposed to during use of the vehicle in various environmental conditions.

The wires are positioned in slight tension when the stalk 11 is in the neutral (N) or off position 22. Moving the stalk 11 up or down by rotation about the pivot point P actuates a right or left turn signal, which would stretch (plastically deform) one of the shape memory alloy wires (12 or 14) opposing the rotation and release the slight tension in the counter opposing wire. The mechanism used to lock the stalk at the end of rotational arc 24 or 26, e.g., detent positions "1" or "2" (also referred to herein as the active detent positions), so that the desired turn signal remains actuated independent of operator manipulation is such that the tensile force applied by the opposing (plastically deformed) shape memory alloy wire 12 or 14 is insufficient to cause release back to the neutral position 22.

As previously discussed, shape memory alloys undergo phase transformations that can be thermally manipulated. The phase transformation results in a change in modulus, and/or shape orientation. As employed herein, subsequent heating of the shape memory alloy wire opposing the end of the rotational arc to a temperature equal to or greater than the phase transition temperature for the shape memory alloy would increase the modulus properties specific to the shape memory alloy by a factor of about 2.5 to 3 and cause the wire to return to its original dimension. In one embodiment, exceeding the phase transformation temperature causes the shape memory alloy wire to shorten and stiffen. The simultaneous increase in modulus caused by the phase change (e.g., martensite to austenite) and increase in tension caused by the change in length dimension to the shape memory alloy wire would be of sufficient force to return the stalk to the neutral position, thereby automatically canceling continued actuation of the turn signal.

Optionally, a mechanical assist such as a spring in parallel relationship to the shape memory wires may be used. The springs are utilized so as to store elastic energy such that optimization of the forces in the shape memory alloy can be readily selected.

A controller (not shown) is in operative communication with the shape memory alloy and is programmed to selectively provide an activation signal to the shape memory alloy. As such, automatic cancellation of the turn signal can be achieved based on a variety of inputs as may be desired. The activation signal may comprise resistive heating such as by passing a current through the wire. Other alternative activation means include, but are not intended to be limited to, conductive heating of the wire, convective heat transfer from a fluid in thermal communication with the wire, and the like.

As previously disclosed, the turn signal assemblies disclosed herein can be made to be passive so as to require no external control and/or be logically controlled based on sensor input to effect automatic cancellation. In passive systems, a pulse of current can be sent to the SMA wire using sensor inputs. For example, each current pulse can resistively increase the temperature of the shape memory wire. After receiving one or more pulses of current the phase transition temperature would be exceeded and cause the wire to change phase from the lower modulus martensite phase to the stiffer austenite phase. Once the transition temperature is exceeded, moment acting on the stalk is increased sufficiently to return it to its original off position.

In logic based sensor systems, sensor input is employed to determine when the turn signal cancellation occurs, which can be based on a variety of sensor inputs. Exemplary sensor inputs include, but are not intended to be limited to, vehicle velocity, distance traveled, time based and turning radius. For example, if subsequent to turning on the turn signal the steering wheel is rotated insufficiently to effect release of the stalk, a controller can be programmed to send a current to the stretched portion of the SMA after a predetermined period of time or a predetermined distance traveled at a constant steering radius or without an additional significant turn of the wheel or the like. The controller can be programmed to send a suitable current based on any input that may be desired. In this manner, in driving situations where the turn signal is actuated and the steering wheel is ineffective to result in automatic cancellation, a logic based sensor can be programmed to thereby prevent a turn signal left-on condition, of which the driver may be unaware while driving.

Figure 2:
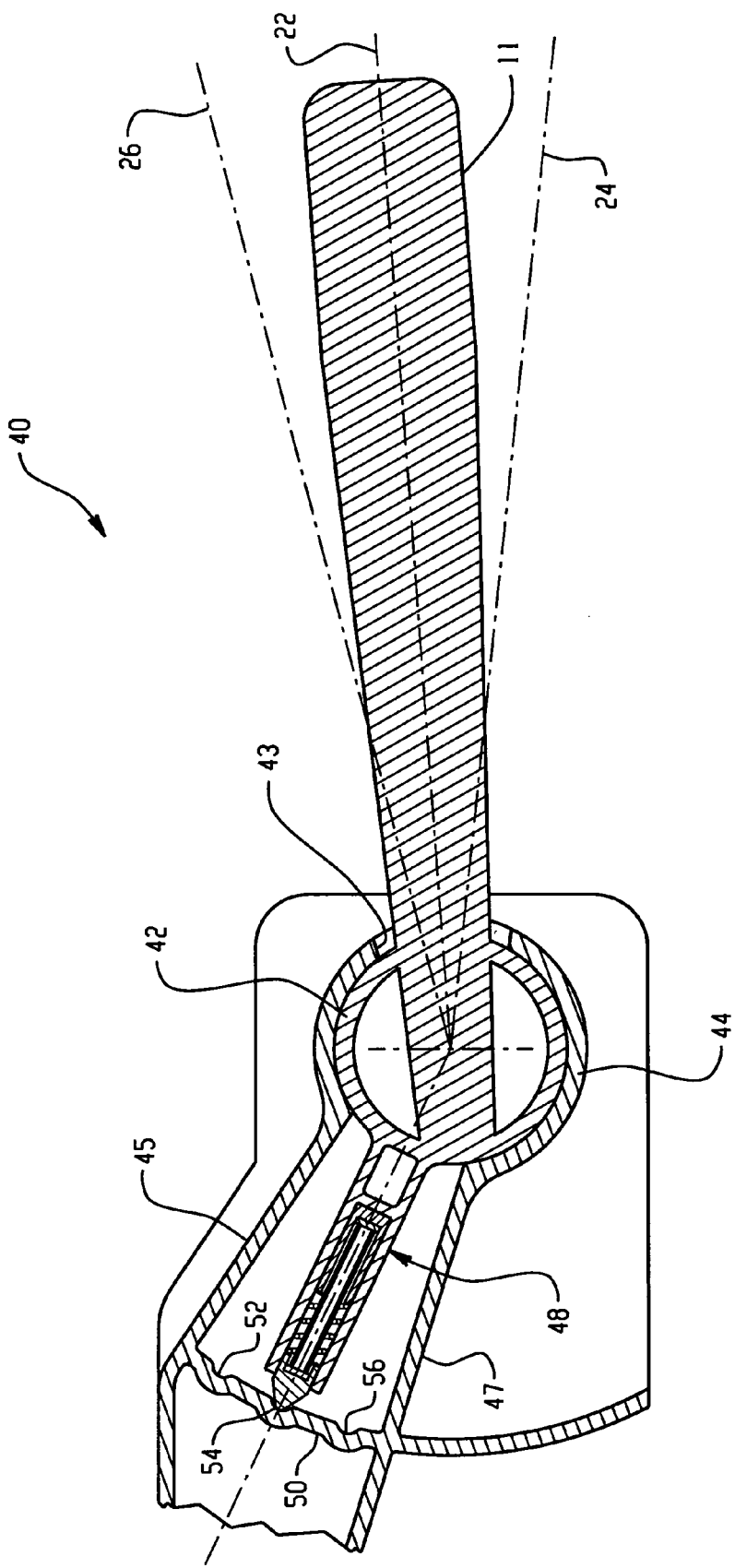
FIG. 2 illustrates a front plan view of a turn signal assembly for a motor vehicle in accordance with a second embodiment.
Figure 3:
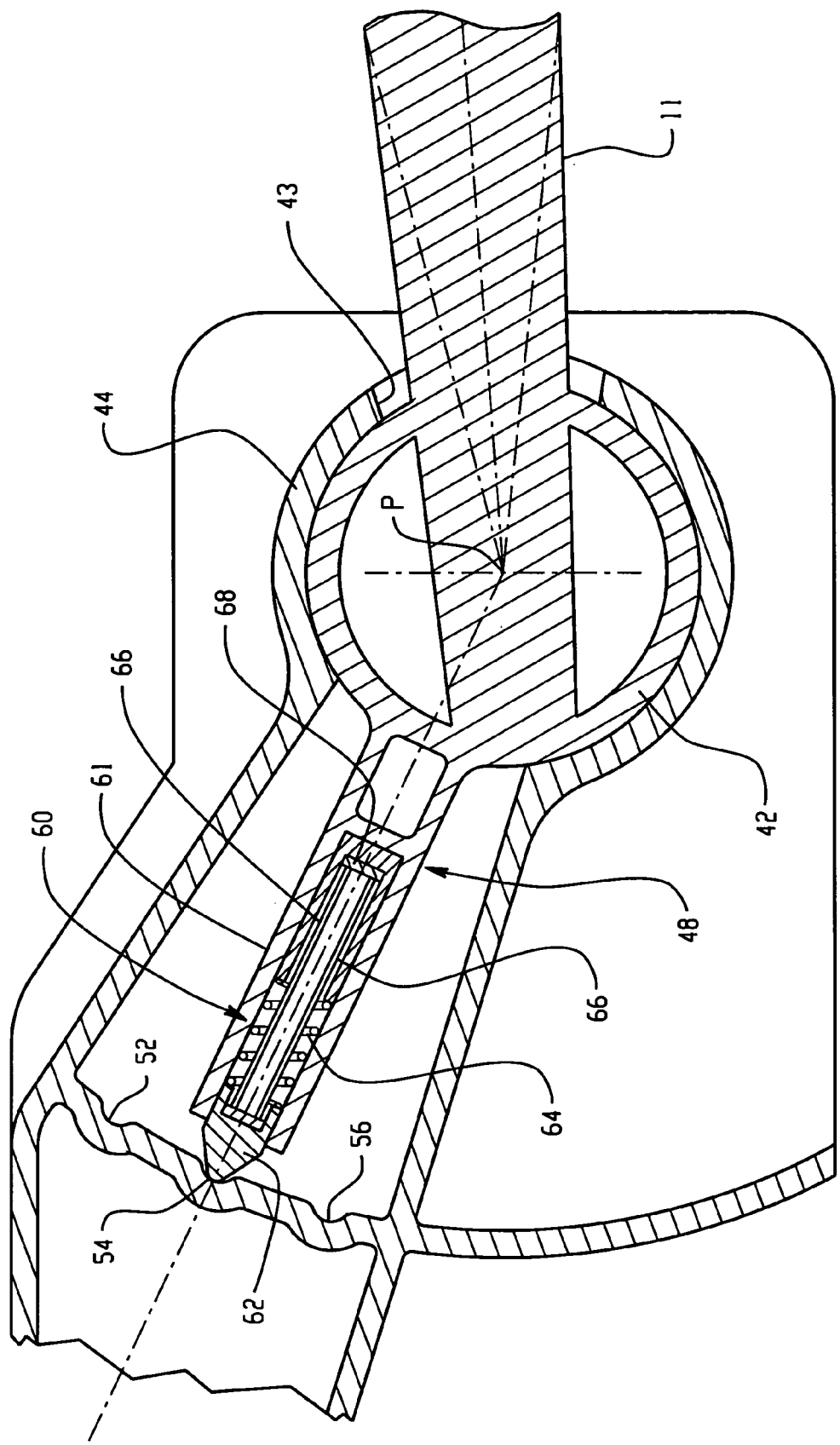
FIG. 3 illustrates an enlarged plan view of the actuation mechanism for the turn signal assembly of FIG. 2.

FIGS. 2 and 3 illustrate a turn signal assembly 40 in accordance with another embodiment. The turn signal assembly 40 includes a turnstile portion 42 rotatably housed within housing 44, which is located in the steering wheel column. A lever arm, i.e., stalk 11, for actuating a desired turn signal is attached and/or integrated with the turnstile portion 42 and extends from the steering wheel column (not shown) into the vehicle interior. To accommodate movement of the stalk 11, the housing 44 includes an opening 43 correspondingly sized to permit rotational movement of the stalk 11. The turnstile portion 42 further includes a finger portion 48 extending therefrom. The finger portion 48 is contained within housing 44, wherein walls 45 and 47 define the maximum rotational arc of the turnstile portion within the housing 44 and hence, the maximum rotational arc of the lever arm as well as the size of opening 43. Housing 44 further includes wall 50 comprising three recessed detent positions 52, 54, and 56, which correspond to positions 22, 24, 26 of the turn signal lever arm 11. For example, the neutral position 22 of the turn signal stalk corresponds to detent position 54 whereas movement of the lever arm to actuate a turn signal (positions 24 or 26) corresponds to detent positions 52 or 56, respectively.

As shown more clearly in FIG. 3, in one embodiment, the actuation mechanism comprises a shape memory alloy controlled piston assembly 60 disposed within an open ended housing 61 of the finger portion 48. The piston assembly 60 generally includes a piston head portion 62 having a shape adapted to lockingly engage detent positions 52, 54, 56; a spring 64 intermediate to and in operative communication with the piston head portion 62 and a rigid stationary member 68; and one or more shape memory alloy wires 66 in operative communication with the piston head portion 62. One end of the one or more shape memory alloy wires 66 is fixedly attached to the piston head portion 62 and the other end is fixedly attached to member 68. As such, when the lever arm 11 is moved up or down as defined by the limits of the rotational arc, the piston head portion 62 in operative communication with the spring 64 slides along wall 50 until engagement with one of the detent positions 52, 54, or 56. The lever arm 11 and piston head portion 62 remain in the selected detent position until manually moved to a different detent position, automatically canceled by rotation of the steering wheel as it exceeds a predetermined arc angle, or is automatically cancelled as a result of actuation of the shape memory alloy wires.

Actuation of the shape memory alloy wires 66, such as by thermal activation for example, results in a change from its martensite phase to its austenite phase. As a result, the SMA wires 66 shorten causing the piston head portion 62 to retract from the selected detent position. Once the piston head portion 62 is retracted, one or more additional springs can be employed so that the lever arm 11 automatically returns to the neutral position 22. A controller (not shown) in operative communication with the shape memory alloy wires can be programmed to selectively provide a suitable activation signal and as such, automatic cancellation.

Figure 4:
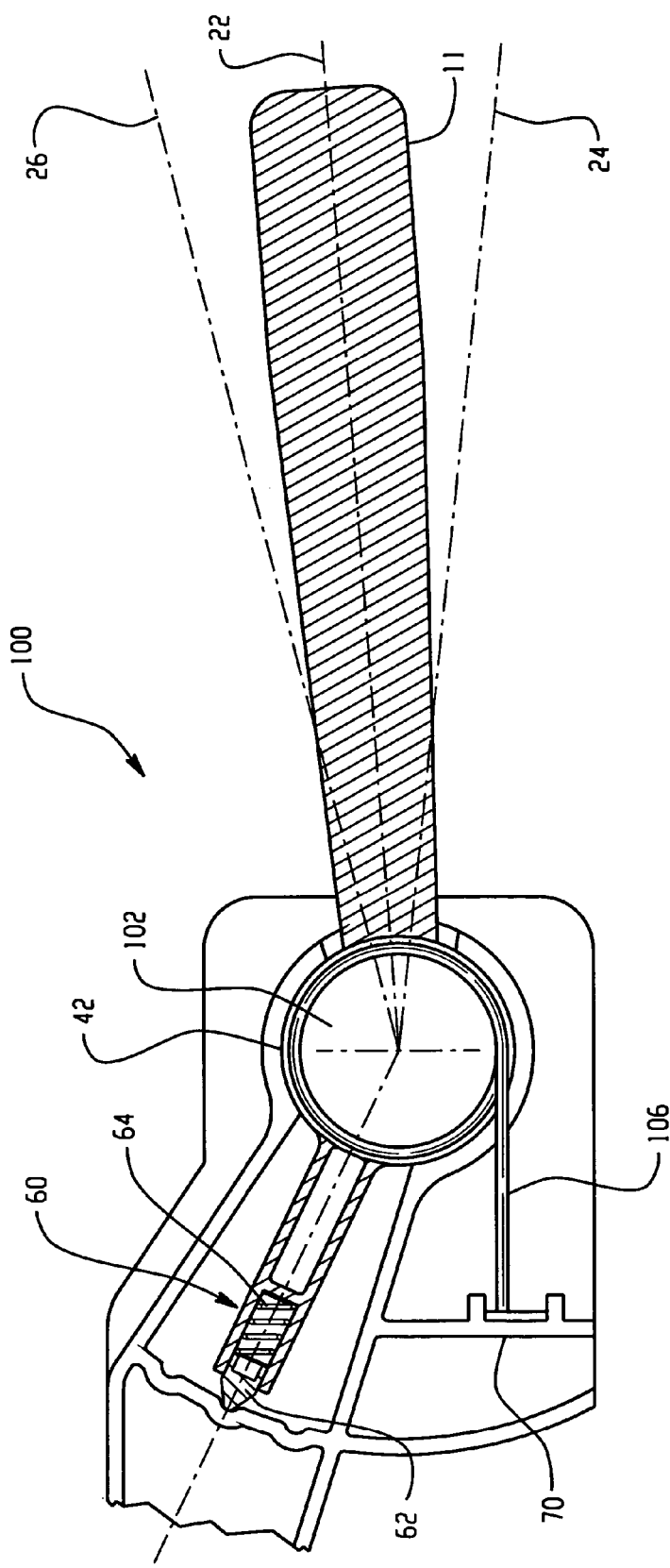
FIG. 4 illustrates a front sectional view of a turn signal assembly for a motor vehicle in accordance with a third embodiment.
Figure 5:
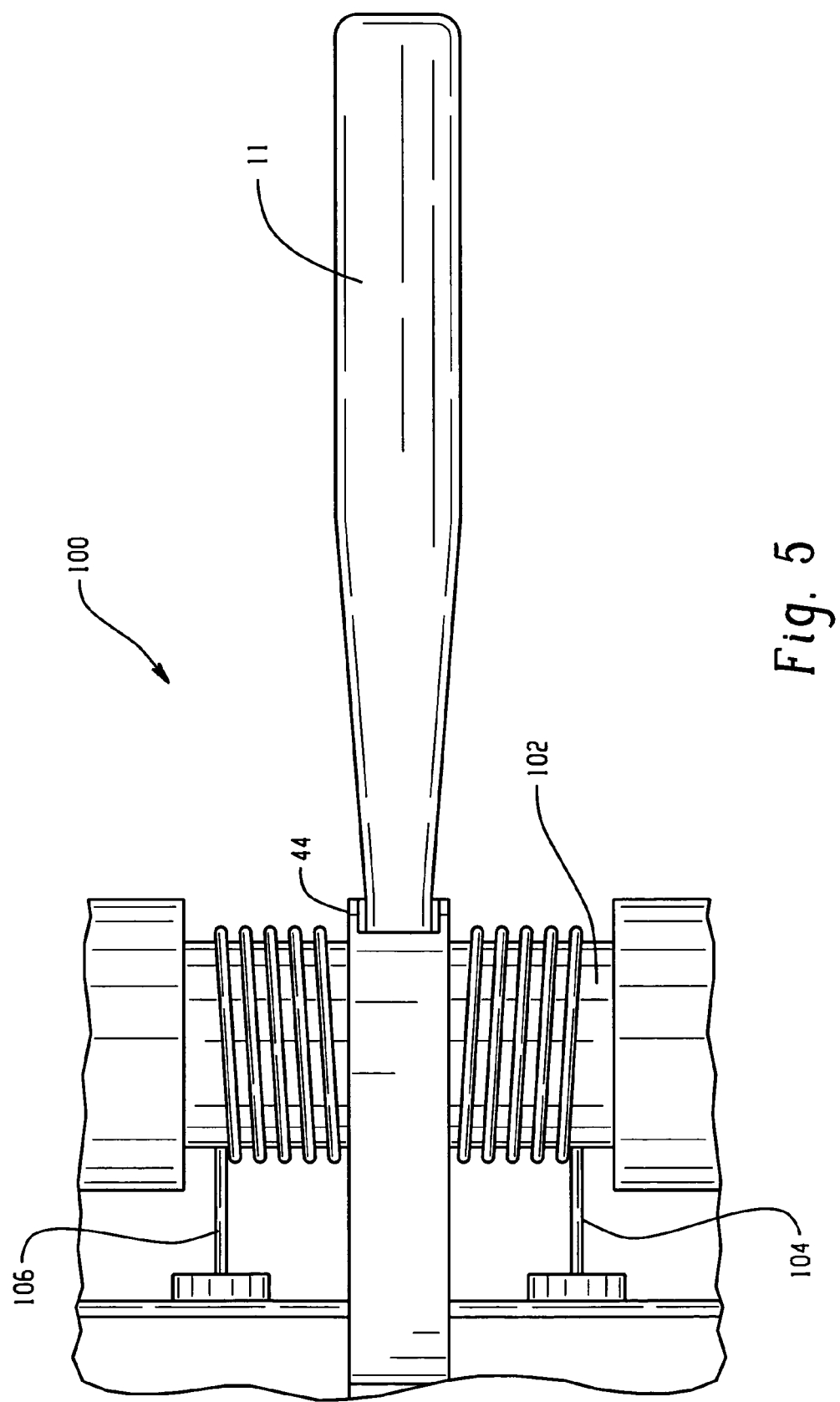
FIG. 5 illustrates a top plan view of the turn signal assembly of FIG. 4.

Alternatively, the shape memory wire 106 can be operatively connected to the turnstile portion 42 as shown in the turn signal assembly 100 of FIGS. 4 and 5. In this embodiment, one end of each of the shape memory alloy wires 104 and 106 are fixedly attached to the turnstile portion 42 and the other ends are fixedly attached to a rigid and stationary member 70 external to rotatable turnstile portion 42. In this embodiment, the piston assembly 60 includes a bias spring 64 in operative communication with the piston head portion 62. Depending on the location of the lever arm 11, e.g., position 24 or 26, activation of one of the shape memory alloy wires 104 or 106 results in shortening of that wire causing the turnstile portion to rotate accordingly within the housing, thereby providing a means for automatically returning the lever arm to the neutral position 22. As previously described, a controller (not shown) can be programmed for providing a suitable activation signal to the shape memory alloy wires for a variety of scenarios. In one embodiment, the shape memory alloy is a two-way shape memory alloy. Optionally, a bias spring can be employed in combination with the shape memory alloy.

FIG. 5 illustrates a top plan view of the turn signal assembly 100. In this embodiment, the arm 11 is attached to and/or integrated with the rotatable turnstile portion 42. The rotatable turnstile portion 42 includes the finger portion 48 including the first, second and third detent positions 52, 54, and 56 as previously described and shown in relation to FIGS. 2 and 3. SMA wires 104, 106 are wrapped about a rotatable member 102 coupled to the turnstile portion 42 in a counter-opposing direction as shown. Activation of SMA wire 104 causes rotation in one direction, e.g., from turn signal stalk position 52 to a neutral position 54. In contrast, activation of SMA wire 106 causes rotation in the other direction, e.g., from turn signal stalk position 56 to a neutral position 54. The wire that is not activated is in the lower modulus martensite phase. The number of wraps can vary from 1 to n depending on the desired application, which is generally related to the amount of force and displacement desired to effect disengagement from the engaged detent position, e.g., detent positions 52 or 56. The SMA wires 104, 106 are operatively connected to a controller (not shown) that provides selective activation of one of the wires 104, or 106.

Figure 6:
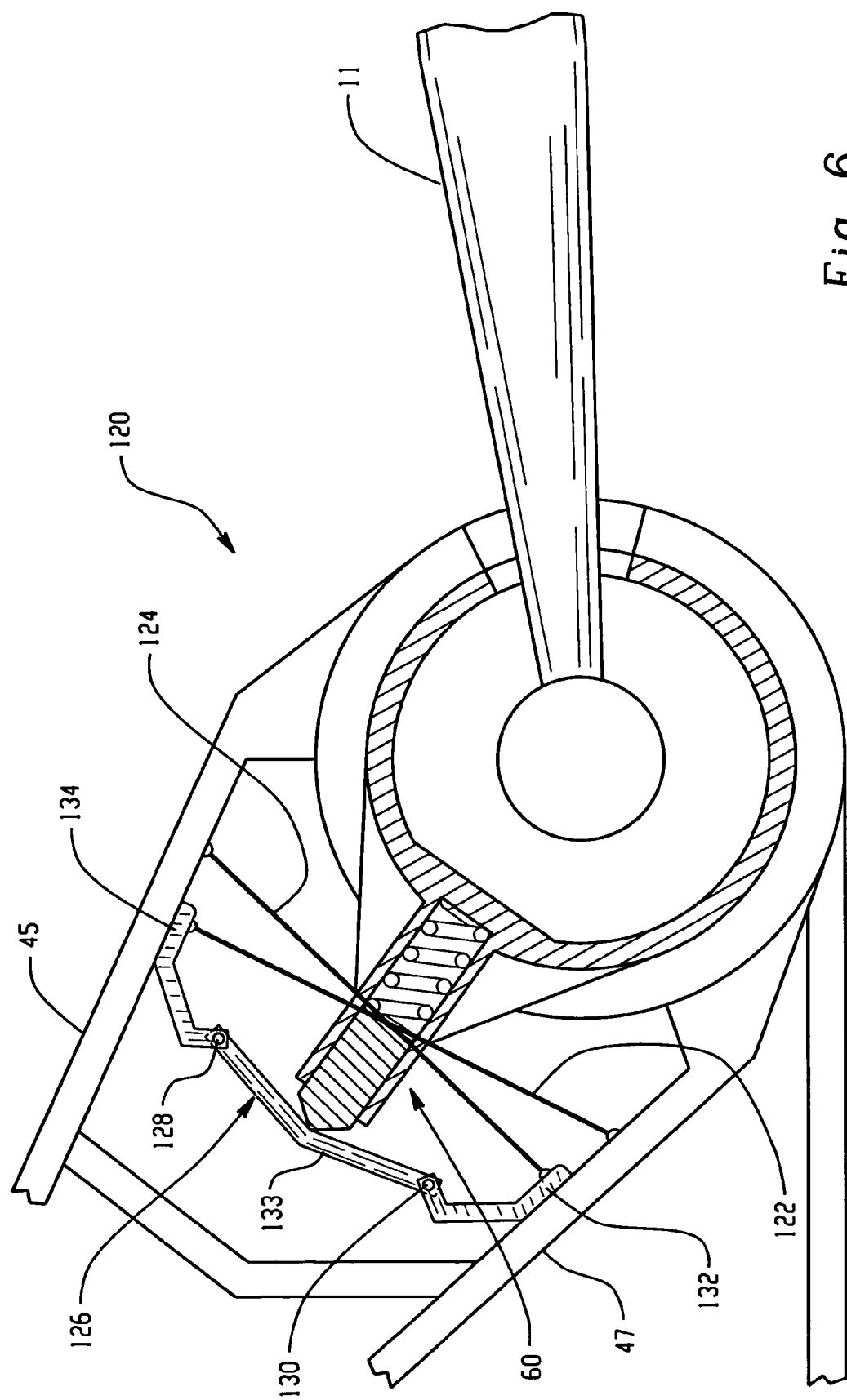
FIG. 6 illustrates a front plan view of a turn signal assembly for a motor vehicle in accordance with a fourth embodiment.
Figure 7:
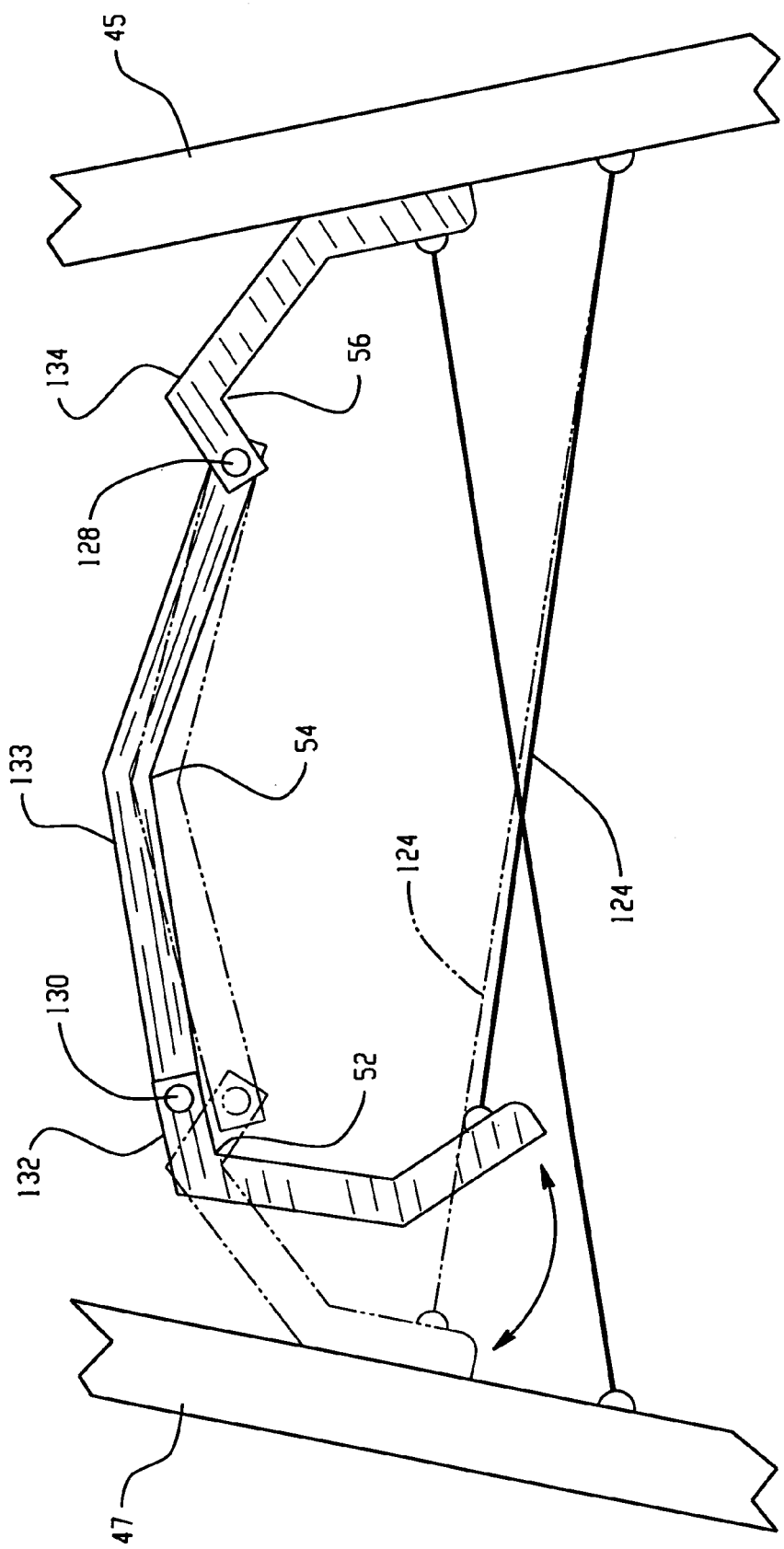
FIG. 7 illustrates an enlarged plan view of the actuation mechanism for the turn signal assembly of FIG. 6.

FIG. 6 illustrates turn signal assembly 120. The piston housing assembly 60 is as described in FIG. 4, i.e., a spring is contained within the finger portion and is in operative communication with the piston head, which engages one of the detent positions. In this embodiment, a detent member 126 defines the various detent positions. The detent member 126 comprises three members 132, 133, and 134 pivotably attached in series at pivot locations 128, 130. A first shape memory alloy wire 124 is fixedly attached to a free end of pivot member 132 and opposing housing wall 45. A second shape memory alloy wire 122 is fixedly attached to a free end of pivot member 134 and opposing housing wall 47. During operation, stalk 11 is moved from the neutral position 22 to position 24 or 26 so as to activate a turn signal. Members 132 and 134 each generally comprise a first section and a second section disposed at a fixed non-linear obtuse angle relative to one another so as to define detent positions e.g., 52, 56. As such, when the turn signal is moved to position 24, 26, the piston head engages the detent position. To automatically cancel the turn signal, the corresponding shape memory alloy wire is activated causing the member 132 or 134 to pivot about pivot location 128 or 130. As a result, the section of member 132 or 134 that is adjacent to the pivot location is co-linear with member 133 causing the piston head to slide downward to detent position 54, i.e., the neutral position as shown more clearly in FIG. 7. Note that it is to be understood that detents, as used here, are intended to include the wide range of forms obvious to those skilled in the art such as pins, slots, or other mechanisms that hold position.

Advantageously, the present disclosure also combines the many conventional and difficult to assemble components into a few parts that are easily assembled and are produced at a low cost. Furthermore, the present disclosure can be packaged into a compact space and can be installed within many existing steering systems.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. Furthermore, all ranges disclosed herein are inclusive of the endpoints and independently combinable.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A turn signal assembly comprising:
 a turnstile portion rotatably disposed within a housing and
  an arm lever extending from the turnstile portion;

a first stationary member disposed at an end of the arm lever, wherein the first stationary member is stationary relative to the arm lever;

a second stationary member disposed within and stationary relative to the turnstile portion;

at least two counter opposing wires formed of a shape memory alloy attached to the first stationary member and at a pivot point of the second stationary member, wherein the at least two counter opposing wires are spaced apart at the first stationary member and define the pivot point at the second stationary member; and a controller in operative communication with the shape memory alloy.

2. The turn signal assembly of claim 1, wherein the shape memory alloy is in a martensite phase at a normal operating temperature of the turn signal assembly.

3. The turn signal assembly of claim 1, wherein the at least two counter opposing wires are spaced apart by a spacer intermediate the at least two counter opposing wires.

4. The turn signal assembly of claim 1, wherein the assembly is free of detent positions.

5. A turn signal assembly comprising:

a turnstile portion rotatably disposed within a housing, wherein the housing further comprises a wall having a first detent position, a second detent position, and a third detent position;

an arm lever fixedly attached to the turnstile portion and extending from an opening in the housing;

a finger portion fixedly attached to the turnstile portion, wherein the finger portion houses a piston head assembly in operative communication with a selected one of the first detent position, the second detent position, and the third detent position, wherein the piston head assembly comprises an open ended housing, a slidable piston head disposed at the open end, a bias spring intermediate the slidable piston head and a back wall within the open ended housing, and a shape memory alloy in operative communication with the piston head and adapted to slide the piston head within the open ended housing; and a controller in operative communication with the shape memory alloy.

6. The turn signal assembly of claim 5, wherein the shape memory alloy is at least one wire extending parallel to the bias spring and is attached at one end to the piston head and at an other end to the back wall.

7. The turn signal assembly of claim 5, wherein the shape memory alloy is selected to be in a martensite phase at a normal operating temperature of the turn signal assembly.

8. A turn signal assembly comprising:

a rotatable member engaged with a turnstile portion rotatably disposed Within a housing, wherein the housing further comprises a wall having a first detent position, a second detent position, and a third detent position;

an arm lever fixedly attached to the turnstile portion and extending from an opening in the housing;

a first wire formed of a shape memory alloy wrapped about the rotatable member in a first direction and having one end fixedly attached to the rotatable member and an other end fixedly attached to a stationary member external to the rotatable member;

a second wire formed of the shape memory alloy wrapped about the rotatable member in a direction opposite to the first direction and having one end fixedly attached to the rotatable member and an other end fixedly attached to a stationary member external to the rotatable member; and a controller in operative communication with the shape memory alloy.

9. The turn signal assembly of claim 8, wherein the first wire and the second wire are formed of different shape memory alloys having different martensite phase temperatures.

10. The turn signal assembly of claim 8, wherein the shape memory alloy is selected to be in a martensite phase at a normal operating temperature of the turn signal assembly.

11. A turn signal assembly comprising:

an arm lever fixedly attached to a turnstile portion, the turnstile portion rotatably disposed within a housing, wherein the housing further comprises opposing sidewalls;

a detent member comprising a first element having one end pivotably attached to one end of a second element and a third element pivotably attached to an other end of the second element, each one of the first and third elements having a free end spring biased against a selected one of the opposing sidewalls, wherein the first and third elements define temporary detent positions and the second element defines a permanent detent position;

a first shape memory alloy wire connected to the free end of the first element and one of the opposing sidewalls, and a second shape memory alloy wire connected to the free end of the third element and the other one of the opposing sidewalls;

a finger portion projecting from the turnstile portion and engageable with a selected one of the first, second, and third detent positions; wherein the finger portion houses a piston head assembly in operative communication With a selected one of the first detent position, the second detent position and the third detent position; and a controller in operative communication with the first and second shape memory alloy wires.

12. The turn signal assembly of claim 11, wherein the first wire and the second wire are formed of different shape memory alloys having different martensite phase temperatures.

13. The turn signal assembly of claim 12, wherein the shape memory alloy is selected to be in a martensite phase at a normal operating temperature of the turn signal assembly.

14. A process for operating a turn signal, the process comprising:

manually moving a turn signal stalk to an active detent position to actuate the turn signal and plastically deform a shape memory alloy wire in biased communication with the turn signal stalk; and activating the shape memory alloy wire to effect rotational movement of the turn signal stalk from the active detent position to a neutral detent position.

15. The process of claim 14, wherein activating the shape memory alloy comprises pulsing a current to the shape memory alloy.

16. The process of claim 14, wherein activating the shape memory alloy comprises programming a controller to pulse a current after a predetermined period of time.

17. The process of claim 14, wherein activating the shape memory alloy comprises progranuning a controller to pulse a current to the shape memory alloy after a predetermined distance traveled.

18. The process of claim 14, wherein activating the shape memory alloy comprises programming a controller to pulse a current to the shape memory alloy at a constant steering radius.

* * * * *